(12) United States Patent
Dyson et al.

(10) Patent No.: US 12,038,310 B2
(45) Date of Patent: Jul. 16, 2024

(54) ENCODER APPARATUS WITH READHEAD HAVING CIRCUIT BOARD AND A FOLDED SHEET-METAL STRUCTURE TO SUPPORT A LIGHT EMITTING ELEMENT

(71) Applicant: RENISHAW PLC, Wotton-under-Edge (GB)

(72) Inventors: Josh Alexander Dyson, Wotton-under-Edge (GB); Julian Alexander Cluff, Wotton-under-Edge (GB)

(73) Assignee: RENISHAW PLC, Wotton-under-Edge (GB)

( * ) Notice: Subject to any disclaimer, the term of this patent is extended or adjusted under 35 U.S.C. 154(b) by 0 days.

(21) Appl. No.: 17/773,990

(22) PCT Filed: Nov. 12, 2020

(86) PCT No.: PCT/EP2020/081916
§ 371 (c)(1),
(2) Date: May 3, 2022

(87) PCT Pub. No.: WO2021/094457
PCT Pub. Date: May 20, 2021

(65) Prior Publication Data
US 2022/0373364 A1 Nov. 24, 2022

(30) Foreign Application Priority Data
Nov. 15, 2019 (GB) ...................................... 1916662

(51) Int. Cl.
*G01D 5/347* (2006.01)
(52) U.S. Cl.
CPC ..... *G01D 5/34715* (2013.01); *G01D 5/34746* (2013.01)

(58) Field of Classification Search
CPC ........... G01D 5/34715; G01D 5/34746; G01B 11/043
See application file for complete search history.

(56) References Cited

U.S. PATENT DOCUMENTS

| 2,963,538 | A | * | 12/1960 | Dahlgren | ............... H05K 3/281 216/33 |
| 3,344,700 | A | | 10/1967 | Brake | |

(Continued)

FOREIGN PATENT DOCUMENTS

| CN | 101067560 A | 11/2007 |
| CN | 201112407 Y | 9/2008 |

(Continued)

OTHER PUBLICATIONS

May 15, 2020 Search Report issued in British Patent Application No. 1916641.2.

(Continued)

*Primary Examiner* — Jennifer D Bennett
(74) *Attorney, Agent, or Firm* — Oliff PLC

(57) ABSTRACT

An encoder apparatus including a readhead for reading a reflective scale located adjacent the readhead. The readhead includes a circuit board on which a sensor including one or more photodiodes for detecting light reflected from a scale located adjacent the readhead is mounted, and at least one light emitting element. The light emitting element is mounted to the circuit board via a light emitting element support structure which holds the light emitting element away from the circuit board and the sensing plane of the sensor, and at least a part of which extends over the sensor.

11 Claims, 6 Drawing Sheets

(56) References Cited

U.S. PATENT DOCUMENTS

| | | | |
|---|---|---|---|
| 4,776,701 A | 10/1988 | Pettigrew | |
| 4,778,273 A | 10/1988 | Michel | |
| 4,799,798 A | 1/1989 | Erb | |
| 4,959,542 A | 9/1990 | Stephens | |
| 5,223,708 A | 6/1993 | Van Deventer | |
| 5,317,149 A | 5/1994 | Uebbing et al. | |
| 5,539,519 A | 7/1996 | Takagi et al. | |
| 5,592,824 A | 1/1997 | Sogabe et al. | |
| 5,691,814 A | 11/1997 | Strasser | |
| 5,751,492 A | 5/1998 | Meyers | |
| 5,841,134 A | 11/1998 | Burgschat et al. | |
| 5,861,953 A | 1/1999 | Henshaw | |
| 5,900,983 A | 5/1999 | Ford et al. | |
| 5,995,229 A | 11/1999 | Omi | |
| 5,995,299 A | 11/1999 | Yoon | |
| 6,198,534 B1 | 3/2001 | Hofer et al. | |
| 6,465,773 B1 | 10/2002 | Rodi | |
| 6,940,603 B2 | 9/2005 | Ito | |
| 6,943,888 B2 | 9/2005 | Ishikawa | |
| 6,972,402 B2 | 12/2005 | Ohmura et al. | |
| 7,193,204 B2 | 3/2007 | Mitchell | |
| 7,417,218 B2 | 8/2008 | Yamamoto et al. | |
| 7,423,768 B2 | 9/2008 | Benner | |
| 7,473,886 B2 | 1/2009 | Benner | |
| 7,495,583 B2 | 2/2009 | Tan et al. | |
| 7,499,827 B2 | 3/2009 | Gordon-Ingram | |
| 7,525,085 B2 | 4/2009 | Saidan et al. | |
| 7,659,992 B2 | 2/2010 | McMurtry et al. | |
| 7,675,026 B2 | 3/2010 | Um et al. | |
| 7,732,756 B2 | 6/2010 | Lum et al. | |
| 7,795,576 B2 | 9/2010 | Chin et al. | |
| 7,982,175 B2* | 7/2011 | Bahari | G01D 5/34715 356/616 |
| 8,193,483 B2 | 6/2012 | Chin et al. | |
| 8,247,758 B2 | 8/2012 | Lum et al. | |
| 8,476,577 B2 | 7/2013 | Nagahama et al. | |
| 8,505,210 B2 | 8/2013 | Gribble et al. | |
| 8,637,805 B2 | 1/2014 | Altendorf et al. | |
| 10,132,657 B2 | 11/2018 | Gordon-Ingram et al. | |
| 10,907,997 B2 | 2/2021 | Evans et al. | |
| 11,009,374 B2 | 5/2021 | Evans et al. | |
| 2003/0076507 A1 | 4/2003 | Ito | |
| 2003/0209658 A1 | 11/2003 | Iguchi et al. | |
| 2004/0118758 A1 | 6/2004 | Gordon-Ingram | |
| 2006/0028442 A1* | 2/2006 | Bynum | G06F 3/0317 345/157 |
| 2006/0202113 A1 | 9/2006 | Mizutani et al. | |
| 2007/0114283 A1 | 5/2007 | Foo | |
| 2007/0120047 A1 | 5/2007 | Wong et al. | |
| 2007/0241270 A1 | 10/2007 | Saidan et al. | |
| 2007/0241943 A1 | 10/2007 | Tan et al. | |
| 2007/0262250 A1* | 11/2007 | Benner | G01D 5/347 250/231.13 |
| 2008/0013105 A1 | 1/2008 | McMurtry et al. | |
| 2008/0099669 A1 | 5/2008 | Lum et al. | |
| 2008/0100569 A1 | 5/2008 | Lum et al. | |
| 2008/0316492 A1 | 12/2008 | Cheng et al. | |
| 2009/0057406 A1 | 3/2009 | Yaku et al. | |
| 2010/0127162 A1 | 5/2010 | Lum et al. | |
| 2010/0155586 A1 | 6/2010 | Chin et al. | |
| 2010/0243871 A1 | 9/2010 | Hane | |
| 2010/0314532 A1 | 12/2010 | Chin et al. | |
| 2011/0233390 A1 | 9/2011 | Nagahama et al. | |
| 2011/0233391 A1 | 9/2011 | Altendorf et al. | |
| 2011/0254032 A1* | 10/2011 | Lee | H01L 33/486 257/E33.056 |
| 2012/0007980 A1 | 1/2012 | Gordon-Ingram et al. | |
| 2017/0089737 A1 | 3/2017 | Xie | |
| 2017/0219389 A1* | 8/2017 | Kawai | G01D 5/34707 |
| 2018/0321062 A1 | 11/2018 | Evans et al. | |
| 2018/0356261 A1 | 12/2018 | Evans et al. | |
| 2021/0123774 A1 | 4/2021 | Evans et al. | |
| 2021/0207981 A1 | 7/2021 | Evans et al. | |

FOREIGN PATENT DOCUMENTS

| | | | |
|---|---|---|---|
| CN | 102197282 A | 9/2011 | |
| CN | 102207396 A | 10/2011 | |
| CN | 102279009 A | 12/2011 | |
| CN | 116584991 A | 8/2023 | |
| DE | 1911234 U | 3/1965 | |
| DE | 2316248 A1 | 10/1974 | |
| DE | 221828 A1 | 5/1985 | |
| DE | 3417176 A1 | 11/1985 | |
| DE | 3703327 A1 | 8/1987 | |
| DE | 3702836 A1 | 8/1988 | |
| DE | 3816675 A1 | 3/1989 | |
| DE | 3816675 A1 * | 3/1989 | |
| DE | 3801763 C1 | 6/1989 | |
| DE | 3837134 A1 | 5/1990 | |
| DE | 4226683 A1 | 2/1993 | |
| DE | 4301971 A1 | 8/1993 | |
| DE | 4316250 A1 | 11/1994 | |
| DE | 4436546 A1 | 4/1996 | |
| DE | 19527287 A1 | 1/1997 | |
| DE | 198 43 155 A1 | 4/1999 | |
| DE | 10031691 A1 | 4/2001 | |
| DE | 10 2006 011 540 A1 | 8/2007 | |
| EP | 0 207 121 A1 | 1/1987 | |
| EP | 1447648 A1 | 8/2004 | |
| EP | 3 150 968 A1 | 4/2017 | |
| EP | 3384246 B1 | 5/2020 | |
| GB | 2146765 A | 4/1985 | |
| GB | 2443113 A * | 4/2008 | G06K 19/06 |
| JP | H03-295416 A | 12/1991 | |
| JP | H04-50720 A | 2/1992 | |
| JP | H10-54735 A | 2/1998 | |
| JP | 2005134391 A * | 5/2005 | G01D 5/34715 |
| JP | 2006-284564 A | 10/2006 | |
| JP | 2006-292728 A | 10/2006 | |
| JP | 4713908 B2 | 6/2011 | |
| JP | 2018-072184 A | 5/2018 | |
| TW | 200921055 A | 5/2009 | |
| WO | 91/19163 A1 | 12/1991 | |
| WO | 94/25803 A1 | 11/1994 | |
| WO | 02/084223 A1 | 10/2002 | |
| WO | 2005/124282 A2 | 12/2005 | |
| WO | 2010/116144 A2 | 10/2010 | |
| WO | 2017/093738 A1 | 6/2017 | |

OTHER PUBLICATIONS

Jan. 21, 2021 International Search Report issued in International Patent Application No. PCT/EP2020/081914.

Jan. 21, 2021 Written Opinion of the International Searching Authority issued in International Patent Application No. PCT/EP2020/081914.

U.S. Appl. No. 17/774,013, filed May 3, 2022 in the name of Slack et al.

Avago Technologies. AEDR-8400 Series Data Sheet, 2015, 8 pages.

Broadcom.com. "AEDR-8400-140," 2019, 2 pages.

Wikipedia. "Foucault knife-edge test," 2019, 4 pages.

Abramowitz, Mortimer et al. "Oblique Illumination". https://www.olympus-lifescience.com/en/microscope-resource/primer/techniques/oblique/obliqueintro.

Smilevski, Luka. "Fluorescence Microscopy". https://conductscience.com/fluorescence-microscopy, 2019.

Muller, Matthew S. et al. "Microscopy: Off-the-Shelf Components Enable a New Generation of Confocal Microscopy". https://www.laserfocusworld.com/optics/article/16550130/microscopy-offtheshelf-components-enable-a-new-generation-of-confocal-microscopy, 2014.

Peterson, Alexander W. et al. "High Resolution Surface Plasmon Resonance Imaging for Single Cells". BMC Cell Biology, vol. 15, 2014, https://bmcmolcellbiol.biomedcentral.com/articles/10.1186/1471-2121-15-35.

"Exposed Linear Encoders". Heidenhain, May 2019, pp. 1-71.

May 15, 2020 Search Report issued in British Patent Application No. 1916662.8.

Jan. 26, 2021 International Search Report issued in International Patent Application No. PCT/EP2020/081916.

(56) References Cited

OTHER PUBLICATIONS

Jan. 26, 2021 Written Opinion of the International Searching Authority issued in International Patent Application No. PCT/EP2020/081916.
Illustration of the relative offsets between (i) the sensor and (ii) the light emitting element for various encoder readheads made and sold by Renishaw plc before Nov. 15, 2018.
Apr. 23, 2024 Notice of Allowance issued in U.S. Appl. No. 17/774,013.

* cited by examiner

ENCODER APPARATUS WITH READHEAD HAVING CIRCUIT BOARD AND A FOLDED SHEET-METAL STRUCTURE TO SUPPORT A LIGHT EMITTING ELEMENT

This invention relates to an encoder apparatus, also known as a position measurement encoder, position encoder, or just "encoder". In particular the invention relates to a so-called absolute encoder apparatus.

Encoder apparatus/position measurement devices for measuring the relative position between two moveable objects are well known. Typically, a series of scale markings are provided on one object and a readhead for reading the scale markings on another. The scale markings can be formed integrally with the object or can be provided on a scale which can be secured to the object.

An encoder apparatus is commonly categorised as being either an incremental encoder apparatus or an absolute encoder apparatus. In an incremental encoder apparatus, the scale has a plurality of periodic markings which can be detected by the readhead so as to provide an incremental up/down count. For instance, such a scale is described in European Patent Application no. 0207121. Reference marks can be provided, either next to or embedded in the periodic markings so as to define reference points. For example, such a scale is disclosed in Published International Patent Application WO 2005/124282. An absolute position encoder apparatus typically measures relative displacement by a readhead detecting unique series of marks, e.g. codes, and translating those codes into an absolute position. Such a scale is disclosed in International Patent Application no. PCT/GB2002/001629, and such an encoder is described in detail in WO2010/116144.

An absolute encoder apparatus is distinct from an incremental encoder apparatus in that an absolute encoder apparatus can determine the absolute position of the readhead relative to the scale, on start-up, without requiring relative motion of the readhead in scale. In contrast, in an incremental encoder apparatus, the readhead has to travel to a reference mark in order to determine a zero position.

Encoder apparatus can also be categorised based on their primary means of detecting the features on the scale, e.g. optical, magnetic, inductive, capacitive.

The present invention relates to an improved optical encoder apparatus.

According to a first aspect of the invention there is provided an encoder apparatus comprising a readhead for reading a reflective scale located adjacent the readhead, the readhead comprising a circuit board on which a sensor comprising one or more photodiodes for detecting light reflected from a scale located adjacent the readhead is mounted, and at least one light emitting element, in which the light emitting element is mounted to the circuit board via a light emitting element support structure which holds the light emitting element away from the circuit board and the sensing plane of the sensor. At least a part of the light emitting element support structure, and optionally the light emitting element(s) too, can extend over the sensor. In other words, the light emitting element support structure can overhang, or can be "in-line" with, the sensor. In particular, the light emitting element support structure can be configured such that such that a line extending perpendicular to the plane of the circuit board (or the sensing plane of the sensor) can pass through both a part of the light emitting element support structure and the sensor chip.

Typically, the light emitting element(s) for a readhead is mounted directly on the same circuit board as the sensor, next to the sensor. The inventors have taken a novel approach whereby the light emitting element(s) is(are) mounted to/supported on (physically/structurally) the same circuit board as the sensor via a light emitting element support structure which holds the light emitting element(s) substantially away from the circuit board and the sensing plane of the sensor, for instance such that at least a part of the light emitting element support structure can extend over the sensor. Such a support configuration opens up a new range of optical configurations for readheads. In particular, it enables the light emitting element(s) to be placed substantially in-line with (for instance between) the sensor and other optical components, such as for example a lens and/or diffraction element. This can help to reduce the total number of optical components needed, thereby helping to reduce the size and/or cost of the readhead.

The light emitting element support structure holds the light emitting element(s) away from the circuit board and the sensing plane of the sensor. In other words, this can be such that in a dimension extending perpendicular to the plane of the circuit board (or the sensing plane of the sensor) the light emitting element is spaced apart from the circuit board and the sensor chip. In other words, the light emitting element(s) is located out-of-plane (e.g. in an "elevated position") with respect to the sensor on the circuit board. In other words, the light emitting element support structure suspends the light emitting element away from the circuit board and sensor. For instance, the distance between the light emitting element and the sensor, measured in the direction perpendicular to the plane of the sensor, can be at least 1 mm, for example at least 1.5 mm, for instance at least 2 mm. More particularly, the distance between the centre of the light emitting element's emission surface (or emission point) to the sensing plane of the sensor, in the direction perpendicular to the sensing plane of the sensor, can be at least 1 mm, for example at least 1.5 mm, preferably at least 2 mm, for example approximately 2.5 mm. Said distance can be between 2 mm and 3 mm, for example approximately 2.5 mm.

The light emitting element support structure could be described as being a "raised" light emitting element support structure, in that it is configured to extend, and hold the light emitting element(s), away from the circuit board and sensor. As will be understood, terms such as "raised" and "elevated" are used to aid the description of the relationship between various components, in particular their relative location, but they are not intended to restrict the orientation of the parts described. For example, the term "raised" can be used to describe that the light emitting element support structure rises from the circuit board, regardless of its direction. For instance, in this case, the term "raised" can be used even when the readhead is used in an orientation in which, relative to gravity/earth, the light emitting element will be held below the circuit board and sensor.

The sensor could be a sensor chip/component. Accordingly, as well as the sensor's photodiode(s), the sensor could comprise additional elements/parts, including a body/shell/casing/housing, for instance for the photodiodes and/or other electrical elements of the sensor.

The at least one light emitting element and the sensing plane of the sensor can be separated in the dimension which extends perpendicular to the sensing plane of the sensor. In particular, the light emitting element can be held directly over the sensor. This can be such that a line extending perpendicular to the sensing plane of the sensor passes through both the light emitting element and the sensor.

The light emitting element support structure can comprise a frame. The light emitting element support structure, e.g.

the frame can be mounted to the circuit board separately from the sensor. In other words, optionally, the light emitting element support structure, e.g. the frame, is not mounted via the sensor, but rather is mounted directly to the circuit board. Accordingly, the apparatus can be configured such that the light emitting element support structure (e.g. the frame) does not directly touch/engage the sensor, e.g. such that there is a gap between the light emitting element support structure (e.g. the frame) and the sensor.

The light emitting element support structure (e.g. the frame) can sit astride the sensor. For example, light emitting element support structure (e.g. the frame) could be mounted to the circuit board on at least two (opposing) sides of the sensor, optionally three, for example four/all sides of the sensor.

The light emitting element can be mounted on a top surface of the light emitting element support structure (e.g. the frame). The top surface can be secured to the circuit board via one or more (side) supports extending between the circuit board and the top surface. Accordingly, the frame can comprise a table-like structure.

The top surface and one or more (side) supports of the light emitting element support structure (e.g. the frame) could comprise a single piece of material.

The light emitting element support structure (e.g. the frame) can comprise an opaque material. Accordingly, the light emitting element support structure (e.g. the frame) can be configured/arranged (e.g. shaped, sized and/or located) such that light returning from a scale can pass the light emitting element support structure (e.g. the frame) to reach the sensor. For instance, the light emitting element support structure (e.g. the frame) could comprise one or more holes/windows/openings/apertures through which the light returning from a scale can pass to reach the sensor.

Optionally, the light emitting element support structure can comprise a transparent material. Accordingly, light returning from a scale could pass through the material of the light emitting element support structure to reach the sensor.

The light emitting element support structure (e.g. the frame) can comprise a sheet material structure, e.g. a sheet-metal structure. The use of a sheet material structure can provide significant cost benefits, can reduce the mass of the readhead, and can provide a more deformable structure than other structures (e.g. machined, moulded structures) which can be advantageous during assembly, e.g. when trying to set the height of the light source mounted thereon. Optionally, the sheet material is a folded sheet-material structure, i.e. has been folded to provide the structure/a three-dimensional frame, which holds the light emitting element away from the circuit board, for instance, to provide the top surface and (side) supports. The sheet-material/metal could comprise one or more defined fold lines (e.g. lines of reduced thickness). Such lines could have been etched into the sheet material. Suitable metallic materials include brass, aluminium, tin, cadmium, gold, silver, etc. The light emitting element support structure (e.g. the frame) can be coated with another material. For example, the light emitting element support structure (e.g. the frame) could be coated with brass, aluminium, tin, cadmium, gold, silver, nickel-gold, etc. Preferably, the thickness of the sheet material is not more than 2 mm, for example not more than 1 mm, for instance not more than 0.5 mm.

The light emitting element support structure can be mounted to the circuit board via the sensor chip. The light emitting element support structure can comprise a transparent material and can cover (in other words "extend over") the one or more photodiodes. For instance, the light emitting element support structure could comprise a piece/block of transparent material (e.g. glass, plastic, sapphire, quartz).

A plurality of light emitting elements can be provided. In such a case, the plurality of light emitting elements are preferably provided together so as to act as a single source of light. Optionally, the readhead comprises only one light emitting element.

Optionally, the light emitting element comprises an "un-capped", "un-packaged" or "un-lensed" semiconductor diode, for example a bare-die semiconductor diode. The light emitting element could comprise, for example, a light emitting diode (LED) or a laser (e.g. a vertical-cavity surface-emitting laser (VCSEL)).

The light emitting element support structure could comprise an electrically conductive material. In this case, the light emitting element support structure could comprise the anode and/or cathode for the light emitting element.

Optionally, the apparatus comprises a bond wire support structure extending from the circuit board. A bond wire can extend between it and the light emitting element (so as to provide the anode and/or cathode for the light emitting element).

The bond wire support structure can comprise a frame. The bond wire support structure, e.g. the frame can be mounted to the circuit board separately from the sensor. In other words, optionally, the bond wire support structure, e.g. the frame, is not mounted via the sensor, but rather is mounted directly to the circuit board. Accordingly, the apparatus can be configured such that the bond wire support structure (e.g. the frame) does not directly touch/engage the sensor, e.g. such that there is a gap between the bond wire support structure (e.g. the frame) and the sensor.

The bond wire support structure (e.g. the frame) can sit astride the sensor. For example, bond wire support structure (e.g. the frame) could be mounted to the circuit board on at least two (opposing) sides of the sensor, optionally three, for example four/all sides of the sensor.

The bond wire can be connected to a top surface of the bond wire support structure (e.g. the frame). The top surface can be secured to the circuit board via one or more (side) supports extending between the circuit board and the top surface. Accordingly, the bond wire support structure (e.g. frame) can comprise a table-like structure.

The top surface and one or more (side) supports of the bond wire support structure (e.g. the frame) could comprise a single piece of material.

The bond wire support structure (e.g. the frame) can comprise an opaque material. Accordingly, the bond wire support structure (e.g. the frame) can be configured/arranged (e.g. shaped, sized and/or located) such that light returning from a scale can pass the bond wire support structure (e.g. the frame) to reach the sensor. For instance, the bond wire support structure (e.g. the frame) could comprise one or more holes/windows/openings/apertures through which the light returning from a scale can pass to reach the sensor.

Optionally, the bond wire support structure can comprise a transparent material. Accordingly, light returning from a scale could pass through the material of the bond wire support structure to reach the sensor.

The bond wire support structure (e.g. the frame) can comprise a sheet material structure, e.g. a sheet-metal structure. Optionally, the sheet material is a folded sheet-material structure, i.e. has been folded to provide the structure/a three-dimensional frame, which holds the bond wire away from the circuit board, for instance, to provide the top surface and (side) supports. The sheet-material/metal could comprise one or more defined fold lines (e.g. lines of reduced thickness), for example which could have been formed by etching. Suitable metallic materials include brass, aluminium, tin, cadmium, gold, silver, etc. The light emitting element support structure (e.g. the frame) can be coated with another material. For example, the light emitting element support structure (e.g. the frame) could be coated with brass, aluminium, tin, cadmium, gold, silver, nickel-gold, etc. Preferably, the thickness of the sheet material is not more than 2 mm, for example not more than 1 mm, for instance not more than 0.5 mm.

References herein to "light" refers to electromagnetic radiation (EMR) anywhere from the ultraviolet to the infrared range. For instance, the light might be ultraviolet light, visible light, infrared light, or a combination thereof.

The readhead can comprise an optical device. The optical device could comprise a lens, for example a singlet lens. Optionally, the optical device comprises a diffractive optical element, such as a Fresnel zone plate. Optionally the optical device comprises a holographic optical element, for example a Hologram of a lens. The light emitting element could be held substantially at the optical device's focal plane, whereas the sensor is held substantially away from the lens' focal plane.

The encoder apparatus could be an incremental encoder apparatus. Accordingly, the scale could comprise an incremental scale. The incremental encoder apparatus could comprise one or more reference marks for defining one or more reference positions. Optionally, the encoder apparatus is an absolute encoder apparatus. As will be understood, in contrast to an incremental encoder, an absolute encoder apparatus can determine the absolute position of the readhead relative to the scale without requiring relative movement of the readhead and scale. An absolute encoder comprises an absolute scale which comprises features defining a series of unique positions along its length. The series of unique absolute positions can be defined by features in a plurality of tracks, for example a plurality of adjacent tracks. Optionally, the series of unique absolute position can be defined by features contained in a single track only. For example, the absolute position information can be determined from the combination of features taken along the measuring length of the scale. Accordingly, the encoder apparatus could be configured to extract absolute position information from the image obtained by the sensor. Such extraction could be performed by the readhead or by a device external to the readhead.

Optionally, the readhead is configured to read the scale by obtaining at least one discrete snapshot of the scale (i.e. snapshot image). This can be instead of, for instance, continuously measuring and counting phase. Accordingly, an image of the scale can be obtained by the readhead taking a discrete snapshot of the scale. The snapshot could be taken at one instant in time, or be built up by taking a quick succession of smaller readings of consecutive sections of the scale. Snapshot reading of a scale can provide a number of advantages. For instance, the maximum operating velocity of the scale reader relative to the scale can be greater as it is not limited by the inherent frequency limits of the continuous phase measuring and counting system. Further, in optical systems taking snapshots, the light emitting element only has to be on for a short amount of time which allows the light intensity to be increased relative to a continuous system without increasing the average power consumption or limiting the life time of the source. This increased light intensity can mean that more photons can be captured by the sensor thus reducing the noise floor of the system giving less position noise.

The scale can comprise a series of features which the sensor can detect for determining relative motion/position of the scale and readhead. Such features can be periodically or aperiodically arranged. As will be understood, there are many suitable ways in which the features can be defined on a scale. For instance, features can be defined by markings having particular electromagnetic radiation (EMR) properties, for example particular optical properties, for instance by the particular optical transmissivity or reflectivity of parts of the scale. Accordingly, a feature could for example be defined by parts of the scale having a minimum reflectivity or transmissivity value. Optionally, a feature could for example be defined by parts of the scale having a maximum reflectivity or transmissivity value. Optionally, a feature could for example be defined by the way (e.g. direction) in which it reflects light (e.g. toward and away from the readhead). The features can take the form of lines, dots or other configurations which can be detected by the sensor. Preferred configurations for one-dimensional scales can comprise lines extending across the entire width of a track in a dimension perpendicular to the measuring dimension.

As mentioned above, the readhead can comprise at least one optical device. The at least one light emitting element, at least one sensor and at least one optical device can together with a reflective scale, form an optical system in which the optical device forms an image of an illuminated region of the reflective scale onto the sensor. Preferably, the system's optical path, from the light emitting element to the sensor, passes through the optical device on its way toward and after reflection from the scale. Preferably, the optical path between the light emitting element and the optical device is direct/unreflected. Preferably, the optical path between the optical device and the sensor is direct/unreflected. In other words, the apparatus (e.g. the readhead) can comprise an unreflected optical path between the light emitting element and the optical device and an unreflected optical path between the optical device and the sensor.

Preferably, the optical path of light between the light emitting element and the scale is direct/unreflected and the optical path of light between the scale and the toward the sensor is also direct/unreflected.

For embodiments in which the readhead comprises a shell/housing and a window through which light (from the light emitting element) exits and light (reflected by the scale) enters the readhead (in other words, exists and enters the shell/housing), preferably the entire optical path within the readhead (or within the shell/housing) is direct/unreflected.

Such an arrangement can enable a particularly compact readhead for an optical absolute position measurement device. For example, configuring the readhead such that the light emitted from the light emitting element passes through the same optical device on the outward and return paths, can reduce the number of optical components needed. Also, ensuring a direct/unreflected optical path between the light emitting element and the optical device and a direct/unreflected optical path between the optical device and the sensor, means that reflective optical components (such as mirrors and/or beam-splitters) are not needed, (for instance, the readhead can be without a reflective optical component in the its optical path). Accordingly, the number of optical components in the readhead can be further reduced and the compactness of the readhead can be improved and the complexity reduced.

The apparatus (e.g. the readhead, in particular for example the light emitting support structure) can be configured such that, in the dimension perpendicular to the plane of the sensor, the light emitting element is situated/is located between the sensor and the optical device (e.g. such as a lens). For instance, the light emitting element could be located in the space (or the "volume") between the sensor and the optical device (e.g. delineated by the outer edges/sides of the sensor and optical device).

The light emitting element can be located substantially at the optical device's focal plane such that light emitted thereby is collimated by the optical device. For example, preferably, the light emitting element is located not more than 500 μm (microns) from the optical device's focal plane, more preferably not more than 250 μm (microns) from the optical device's focal plane, especially preferably not more than 100 μm (microns) from the optical device's focal plane.

Optionally, light reflected by the scale and imaged onto the sensor by the optical device converges toward a point at a particular distance between the optical device and the sensor. Further, the light emitting element could be located approximately at said particular distance between the optical device and the sensor.

Optionally, the ratio of: i) the distance between the centre of the light emitting element's emission surface (or emission point) to the sensing plane of the sensor, in the direction perpendicular to the plane of the sensor, and ii) the distance between the centre of the light emitting element's emission surface (or emission point) to the optical device, in the direction perpendicular to the plane of the sensor, is not less than 35:65, for example not less than 40:60, optionally not less than 50:50, preferably not less than 60:40, and for instance not less than 65:35.

The light emitting element could be positioned such that it is offset from the optical device's optical axis. For instance, the light emitting element could be offset (e.g. measured from the centre of the light source's emission zone) by not more than 1 mm, for example not more than 750 μm, for instance not more than 500 μm, from the optical device's optical axis. Optionally, the ratio of the offset to the focal length of the lens is not more than 1:2.5, for example not more than 0.5:2.5.

Optionally, the direction of the optical path as it impinges on and/or reflects from the scale is not perpendicular to the scale. For instance, the angle between a line extending perpendicular to the scale (at the illuminated region) and the direction of the optical path as it impinges on (and/or reflects from) the scale is not less than 1° (degrees), for example not less than 2°, for instance not less than 5°, and optionally is not more than 20°, for instance not more than 15°. In other words, optionally there is an angle between the directions of incidence and reflection (i.e. greater than 0°) of light hitting and reflected from the scale, for example an angle of at least 2°, and for instance at least 4°, optionally at least 10°, and for example not more than 40°, for instance not more than 30°.

Accordingly, optionally, the shape of the optical path as it impinges on and/or reflects from the scale is V-shaped. Optionally, the system's optical path, from the light emitting element to the sensor, is substantially diamond/rhombus-shaped.

The optical paths through the optical device on the way toward and after reflection from the scale could be laterally offset. Accordingly, for example, for any given ray through the optical system, the point at which it exits the optical device toward the scale and the point at which it re-enters the optical device after it has been reflected from the scale is different/laterally offset. As will be understood, the optical paths (e.g. the optical beam) on the way toward and after reflection from the scale could overlap (e.g. partially, and optionally substantially, but not completely).

Optionally, the light emitting element and the sensor both face the optical device and scale. The light emitting element and the sensor could both face in the same direction. In other words, the light emitting element and the sensor could be mounted in the readhead such that the sensor plane is substantially parallel to the emission surface of the light emitting element.

Optionally, the sensor, and the image of the scale formed by the optical device, lies behind (e.g. directly behind) the light emitting element. Optionally, the light emitting element is positioned such that rays from the light emitting element reflected by the scale converge to a point so as to by-pass the light emitting element on the return path, and subsequently diverge and form said image of the scale on the sensor (behind the light source).

As will be understood, an image of the scale is formed when light rays from any given point on the scale substantially converge to a common, unique point at an image plane (where the sensor is located). (The point is "unique" in that for a different given point on the scale, rays from that point will substantially converge to different common point). The image could be a spatially filtered image.

This document describes an encoder apparatus comprising a readhead for reading a reflective scale located adjacent the readhead, the readhead comprising a sensor comprising one or more photodiodes for detecting light reflected from a scale located adjacent the readhead is mounted, and at least one light emitting element, in which the light emitting element is held away the sensing plane of the sensor, such that the distance between the light emitting element and the sensor, measured in the direction perpendicular to the sensing plane of the sensor, is at least 1 mm. This document describes an encoder apparatus comprising a readhead for reading a reflective scale located adjacent the readhead, the readhead comprising a circuit board on which a sensor comprising one or more photodiodes for detecting light reflected from a scale located adjacent the readhead is mounted, and at least one light emitting element, in which the light emitting element is mounted to the circuit board via a light emitting element support structure which holds the light emitting element away from the circuit board and the sensing plane of the sensor, such that the distance between the light emitting element and the sensor, measured in the direction perpendicular to the sensing plane of the sensor, is at least 1 mm. More particularly, the distance between the centre of the light emitting element's emission surface (or emission point) to the sensing plane of the sensor, in the direction perpendicular to the sensing plane of the sensor, can be at least 1 mm. Said distance can be at least 1.5 mm, optionally at least 2 mm, for example at least 2.5 mm. Said distance can be between 2 mm and 3 mm, for example approximately 2.5 mm.

Embodiments of the invention will now be described, by way of example only, with reference to the following drawings, in which.

Figure 9A:
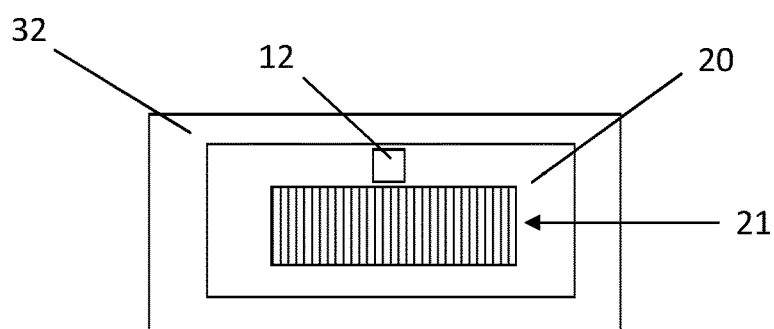
Figure 9B:
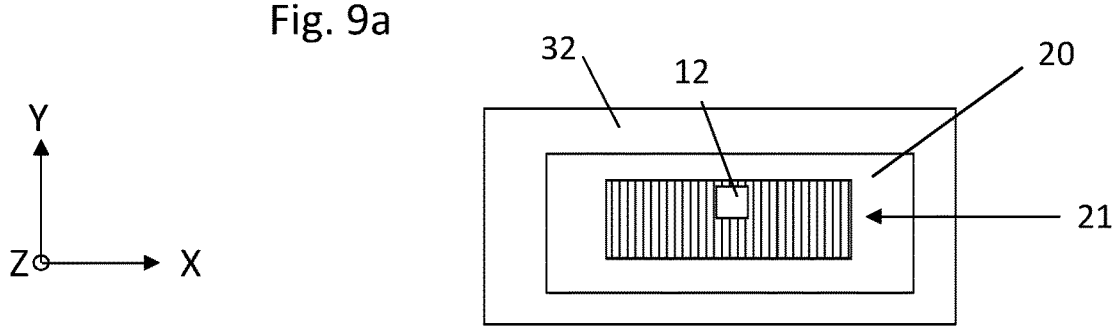

FIGS. 9a and 9b schematically illustrate plan views of a readhead according to the present invention wherein the light source is positioned directly over the sensor.

Figure 1:
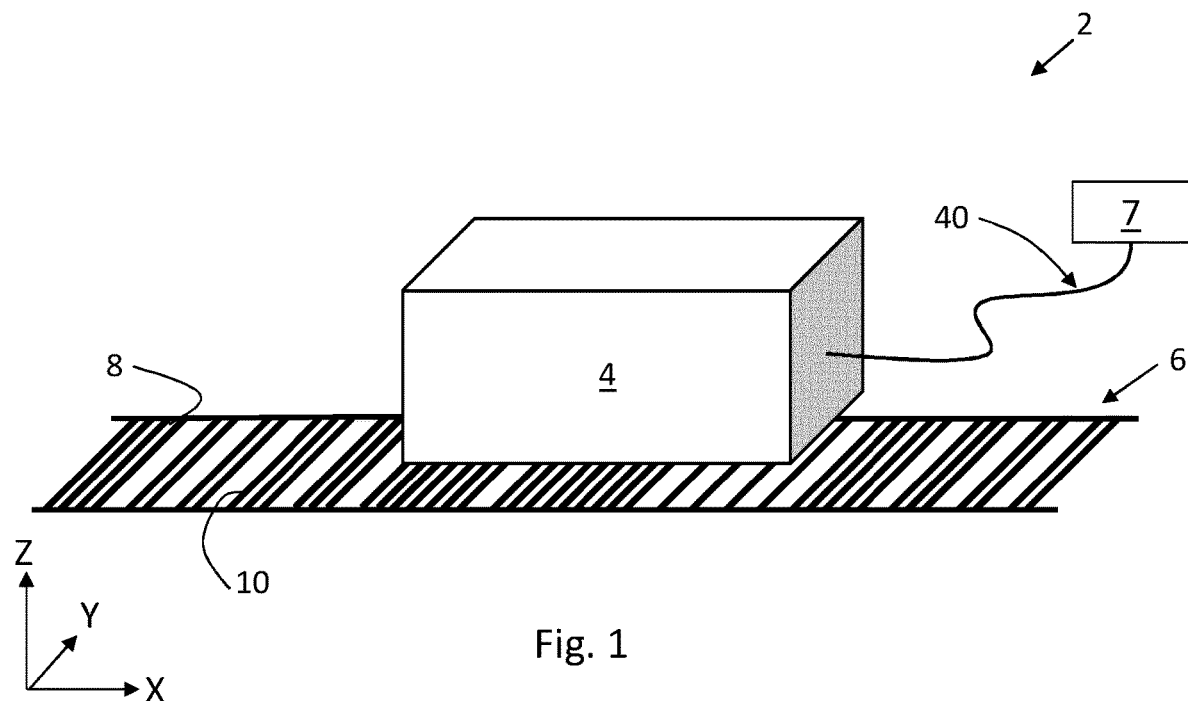
FIG. 1 shows a schematic isometric view of a position measurement device according to the present invention.

Referring to FIG. 1 there is shown an encoder apparatus 2 comprising a readhead 4, scale 6 and controller 7. The readhead 4 and scale 6 are mounted to first and second objects respectively (not shown) which are moveable relative to each other. The velocity of relative movement can vary, but in the described embodiment the readhead 4 and scale 6 have a known maximum relative acceleration.

In the embodiment described, the scale 6 is a linear scale. However, it will be understood that the scale 6 could be a non-linear scale, for example a rotary scale (e.g. disc or ring scale). Furthermore, the scale 6 enables measurement in a single dimension only. However, this need not be the case, and for example the scale could enable measurement in two dimensions.

In the described embodiment, the scale 6 is an absolute scale and comprises a series of reflective 8 and non-reflective 10 lines arranged to encode unique position data along its length. The data can be in the form of, for instance, a pseudorandom sequence or discrete codewords. In other embodiments, the scale could be an incremental scale (with or without a reference mark).

The width of the lines depends on the required positional resolution and is typically in the range of 1 µm to 100 µm, and more typically in the range of 5 µm to 50 µm, for instance in the range of 10 µm to 30 µm. In the described embodiment, the width of the lines is in the order of 15 µm. The reflective 8 and non-reflective lines are generally arranged in an alternate manner at a predetermined period. However, select non-reflective lines 10 are missing from the scale 6 so as to encode absolute position data in the scale 6. For instance, the presence of a non-reflective line can be used to represent a "1" bit and the absence of a non-reflective line can represent a "0" bit.

Figure 2:
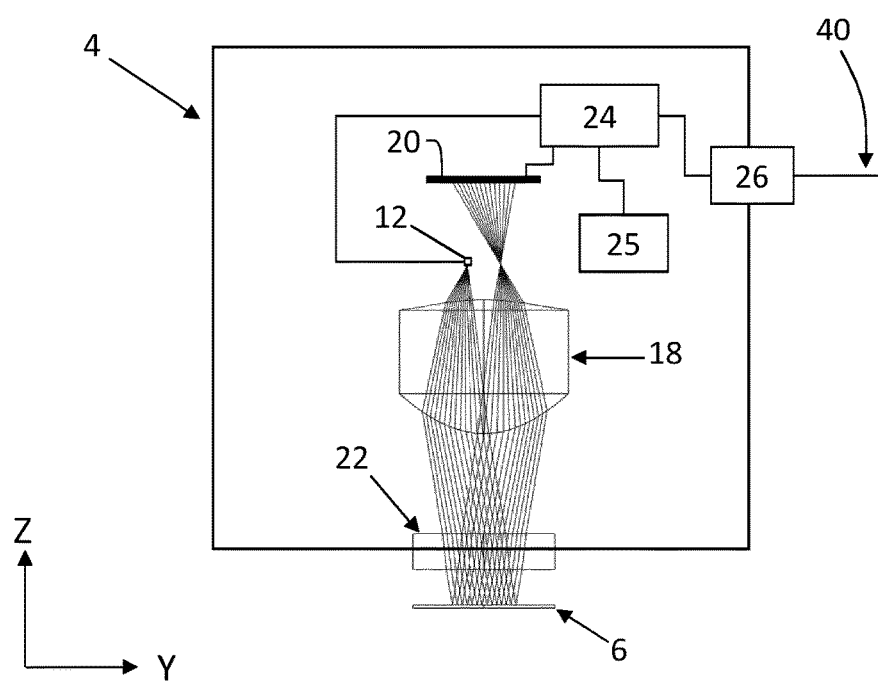
FIG. 2 is a schematic diagram of the various optical and electronic components of the readhead of the position measurement device of FIG. 1.

As illustrated in FIG. 2 the readhead 4 comprises a light emitting element/source 12 an optical device 18, a sensor 20, and a window 22. In this embodiment, the light emitting element/source 12 comprises a light emitting diode (LED). Also, in this embodiment the optical device comprises a lens 18, but other optical devices could be used. For instance, a diffractive optical element, such as a Fresnel zone plate, and/or a holographic optical element could be used, for example a Hologram of a lens. In this embodiment, the sensor 20 comprises a Complementary Metal-Oxide-Semiconductor ("CMOS") sensor. As will be understood, other image sensors could be used instead of a CMOS sensor. For instance, a CCD or a photodiode array could be used instead.

The readhead 4 also comprises a CPU 24, a memory device 25 (for example, Electrically Erasable Programmable Read-Only Memory (EEPROM) or Flash memory) and an interface 26. The readhead 4 may also include an analogue-to-digital converter to digitize the image data from the sensor 20. Optionally, the analogue-to-digital conversion could be performed within the sensor 20 or the CPU 24.

Light emitted from the LED 12 is collimated by the optical device 18, then passes through the window 22 and falls on the scale 6. The scale 6 reflects the light back through the window 22 which passes through the lens 18 which in turn forms a two-dimensional image of the scale onto the sensor 20 using the light reflected by the scale. Accordingly, the sensor 20 detects a two-dimensional image of a part of the scale 6 illuminated by the LED 12. The sensor could comprise a one or two dimensional array of pixels. For instance, the sensor could comprise a one-dimensional array of 256 elongate pixels, whose lengths extend parallel to the lengths of the reflective 8 and non-reflective lines 10 on the scale. Instead of the two-dimensional imaging arrangement described, a one-dimensional imaging arrangement could be used instead, in which a one-dimensional image of the scale is formed by the lens on the sensor.

The LED 12 is connected to the CPU 24 so that the LED 12 can be operated on demand by the CPU 24. The sensor 20 is connected to the CPU 24 such that the CPU 24 can receive an image of the intensity of light falling across the image sensor 20. The sensor 20 is also directly connected to the CPU 24 so that the sensor 20 can be operated to take a snapshot of intensity falling across it on demand by the CPU 24. The CPU 24 is connected to the memory 25 so that it can store and retrieve data for use in its processing. The interface 26 is connected to the CPU 24 so that the CPU 24 can receive demands from and output results to an external device such as a controller 7 (shown in FIG. 1) via line 40. The line 40 also comprises power lines via which the readhead 4 is powered.

As will be understood, absolute position data could be encoded in the scale 6 by missing reflective lines 8, as well as, or instead of, missing non-reflective lines 10. Furthermore, absolute position data could be embedded in the scale 6 without the addition or removal of reflective 8 or non-reflective lines 10. For instance, the width of lines, the distance between them or their colour could be varied in order to embed the absolute position data in the scale 6. Furthermore, rather than the scale defining absolute position by the unique combinations of features taken along the scale's measuring length, the scale could have features defining absolute position by the unique combination of features taken along the width of the scale. For instance, the scale could comprise a plurality of "barcodes" the length of which extend across the scale, e.g. substantially perpendicular to the scale's measuring length. Optionally, the scale could comprise a plurality of tracks, in which at least one, optionally at least two and possibly all of these tracks could comprise a plurality of regularly spaced features (i.e. the tracks could essentially comprise incremental scale features of different fundamental frequencies) in which the scale period of the tracks differ from each other such that the combination of features across the scale's width is unique at any one point along the scale's measuring length.

A series of groups of markings can be used to encode a series of unique binary codewords along the scale length defining unique, i.e. absolute, position information, whilst still having sufficient information in order to enable phase information to be extracted from the series of markings to enable fine position information to be determined (e.g. position information with a resolution finer than the period of the scale markings). Accordingly, in such systems, the position information can be made up from a coarse absolute position (determined from the codeword extracted from the image) as well as a fine position (determined by looking at the phase offset of the substantially periodic markings).

Further details of such a so-called hybrid incremental and absolute scale is described in International Patent Application no. PCT/GB2002/001629 (publication no. WO 2002/084223), the content of which is incorporated in this specification by this reference.

In an alternative embodiment, the scale could comprise an absolute track comprising features defining absolute position information and a separate incremental track comprising regularly spaced features.

Figure 3A:
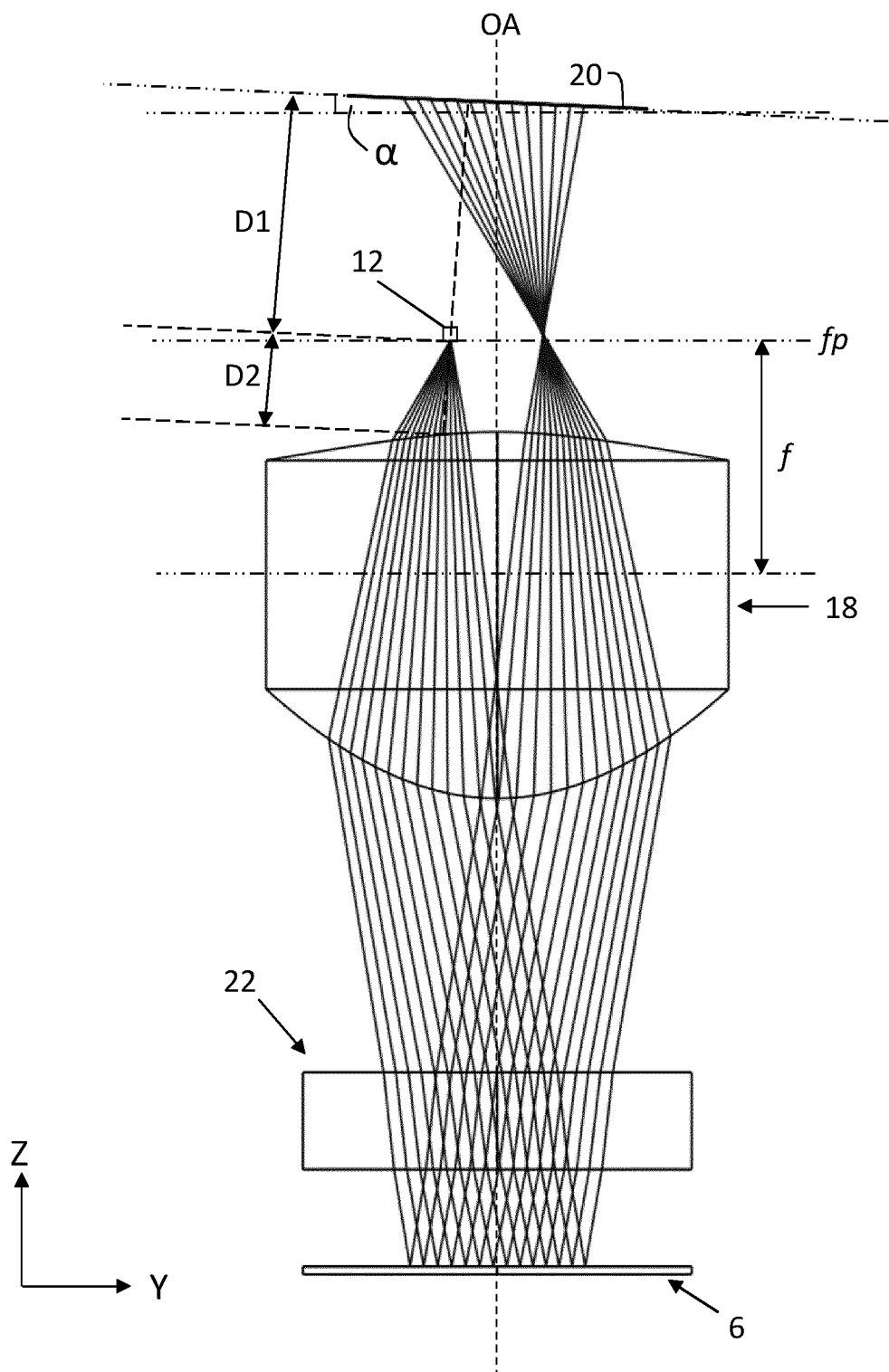
FIGS. 3a and 3b show schematic diagrams of the optical arrangement of the position measurement device of FIGS. 1 and 2.
Figure 3B:
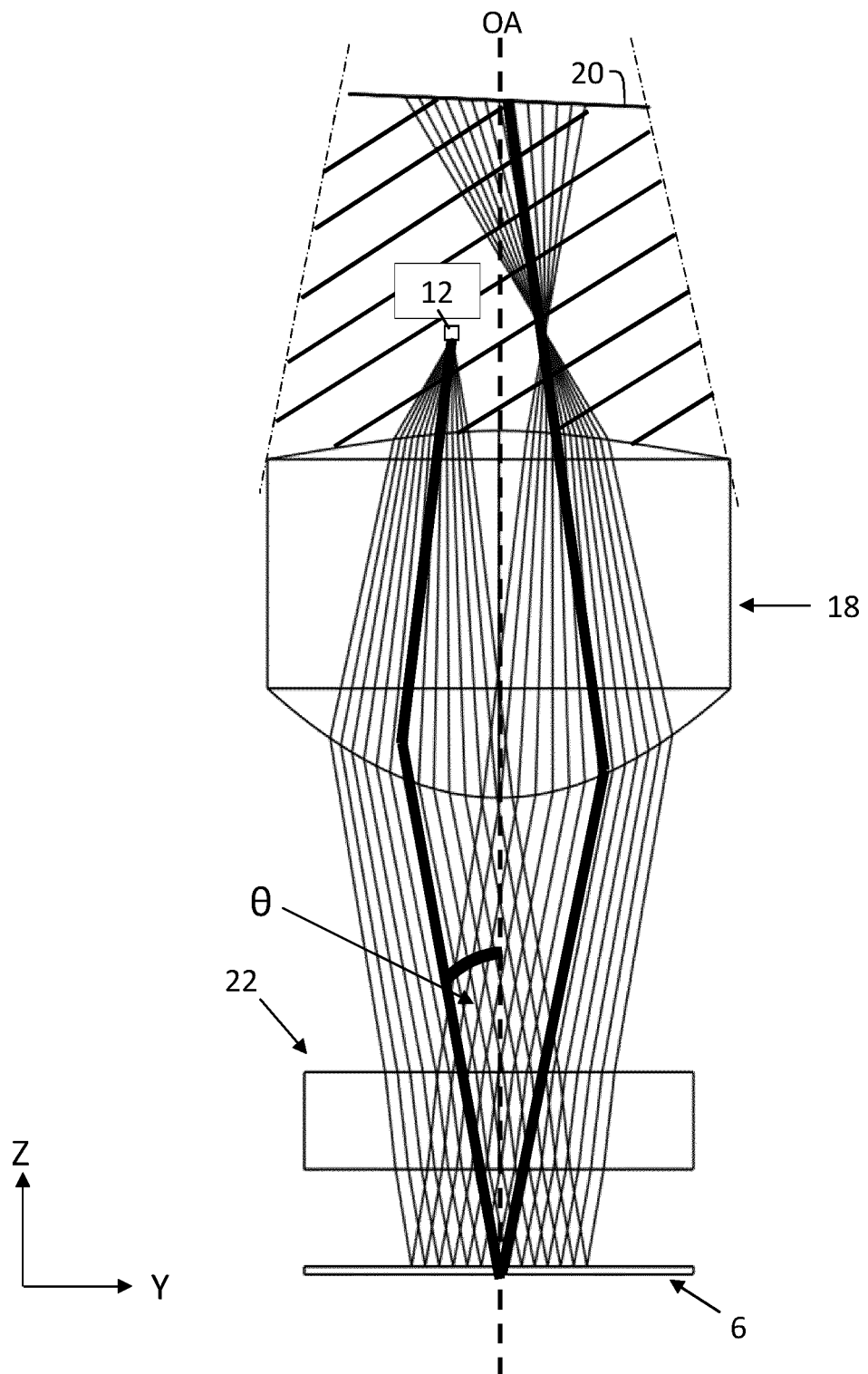

The optical system of the readhead 4 of FIGS. 1 and 2 will be described in more detail with reference to FIGS. 3a and 3b. FIGS. 3a and 3b schematically illustrate the path light takes through the optical system which forms the image of the scale 6 onto the sensor 20, from the light source 12 to the sensor 20.

As shown, the optical device 18 comprises a lens 18 having an optical axis OA, a focal length f and a focal plane fp. As shown, the point light source 12 is located substantially at the lens' 18 focal plane fp, but slightly offset from the lens' 18 optical axis OA. For instance, the light source 12 is offset (measured from the centre of the light source's emission zone) by approximately 450 μm, from the lens' 18 optical axis OA. In particular, the ratio of the offset to the focal length of the lens is approximately 0.45:2.5. Locating the light source 12 substantially at the lens' focal plane 18 helps to ensure that light emitted therefrom is substantially collimated by the lens 18 as it heads toward the scale 6. Accordingly, the light reflected by the scale 6 is then focussed by the lens 18 to a point at the lens' 18 focal plane fp, before diverging and forming a two-dimensional image of the scale 6 at the sensor 20 behind the light source 12. As will be understood, an image of the light source 12 will be formed at the focal plane fp. Locating the light source 12 at lens' 18 focal plane fp, but offset from the lens' 18 optical axis OA, means that the light source 12 can be located in the space (or "volume") between the sensor 20 and the lens 18 (illustrated by the hatched area shown in FIG. 3b), helping to make the readhead compact, but not be in the way of the light reflected by the scale on its return path to the sensor 20.

As shown, both the light source 12 and the sensor 20 face the lens 18 (and the window 22 and the scale 6). (In other words, the emission surface of the light source 12, and the sensing surface of the sensor 20, face the lens 18). Also, there is an unreflected (in other words "direct") optical path between the light source 12 and the lens 18, and also an unreflected (in other words "direct") optical path between the lens 18 and the sensor 20. No reflective optical components are therefore needed or used to turn or steer the light. Avoiding the use of reflective optical components, such as mirrors and beam-splitters, can help to significantly reduce the size of the readhead.

Furthermore, in the particular embodiment described, the same optical device/lens 18 is used to both collimate the light from the light source 12 and to form an image of the scale 6 onto the sensor. Accordingly, the optical arrangement of the described readhead 4 only uses one optical device/lens 18 and so is particularly compact and inexpensive. In the embodiment described, the lens 18 is a singlet lens, but could be a different type of lens (e.g. a doublet lens, compound lens or gradient-index (GRIN) lens. As will be understood, optical device need not necessarily be a lens, but could be another type of optical device such as a Fresnel Zone Plate or a holographic optical element (HOE), for instance a hologram of a lens.

As illustrated in FIG. 3a, the light source is much closer to the lens 18 than it is to the sensor 20. Such a configuration departs from a traditional encoder design where the light source would normally be mounted to the same board as the sensor, approximately in plane with the sensor. As shown in FIG. 3a, in this embodiment, the readhead is configured such that the ratio of i) the distance (D1) between the centre of the light emitting element's emission surface (or emission point) to the sensing plane of the sensor, in the direction perpendicular to the plane of the sensor, and ii) the distance (D2) between the centre of the light emitting element's emission surface (or emission point) to the optical device, in the direction perpendicular to the plane of the sensor, is approximately 70:30. In absolute terms, the distance between the centre of the light emitting element's emission surface (or emission point) to the sensing plane of the sensor, in the direction perpendicular to the sensing plane of the sensor, is approximately 2.5 mm, for instance 2.6 mm.

As schematically illustrated by the heavy black line in FIG. 3b, due to the configuration of the light source 12, lens 18 and sensor 20, the optical path from the source to the sensor is substantially diamond/rhombus-shaped, and the optical path between the lens 18 and scale 6 is substantially V-shaped. In the embodiment described, the angle θ between a line extending perpendicular to the scale (the dotted line in FIG. 3b) and the direction of the optical path as it impinges on the scale is approximately 10°.

As shown, the sensor 20 can be tilted such that it's sensing surface/plane is not perpendicular to the lens' optical axis. Such tilting can help to compensate for any keystone distortion in the image formed on the sensor, which can be formed due to the image being formed by an off-axis part of the lens 18. In the embodiment shown, the sensor 20 is tilted such that the angle α between a plane extending parallel to their sensing surface (e.g. its sensing plane) and a plane extending perpendicular to the optical axis, is about 3°. However, this does not necessarily have to be the case, and the sensor could be configured such that its sensing surface can extend perpendicular to the lens' optical axis (i.e. such that the angle α is less than 1°). As described in more detail below, such tilting of the sensor 20 can achieved by mounting the PCB 32 (to which the sensor is mounted) at a tilted angle. Accordingly, any other components mounted to the sensor 20 or PCB 12, including for example the light source 12, can also be titled for mechanical convenience; although this need not necessarily be the case. As will be understood, other ways of compensating for the keystone distortion are available, such as by appropriately shaping the sensor elements, e.g. "keystoning" the sensor elements themselves.

Figure 4:
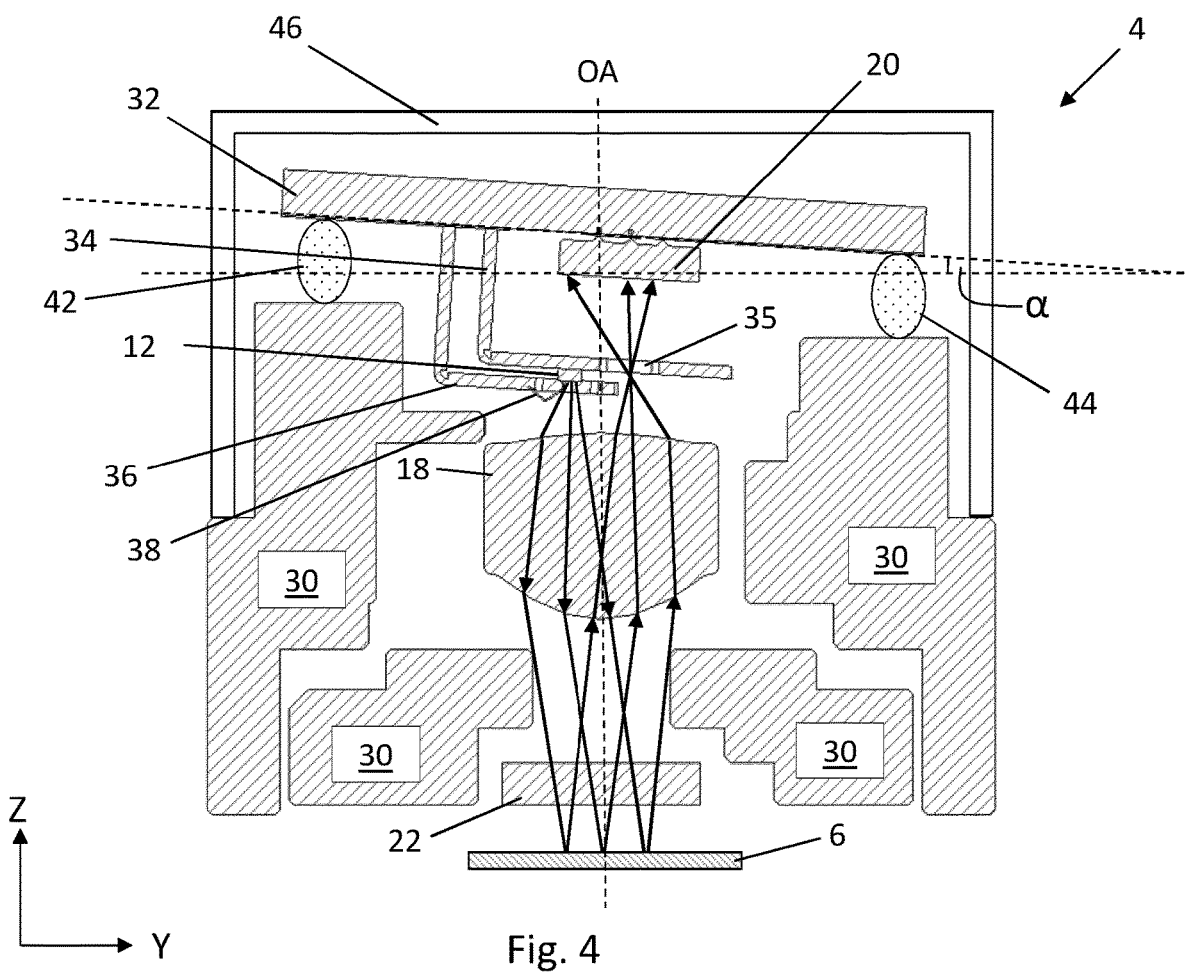
FIG. 4 shows a cross-sectional view of the readhead of FIG. 1.
Figure 5:
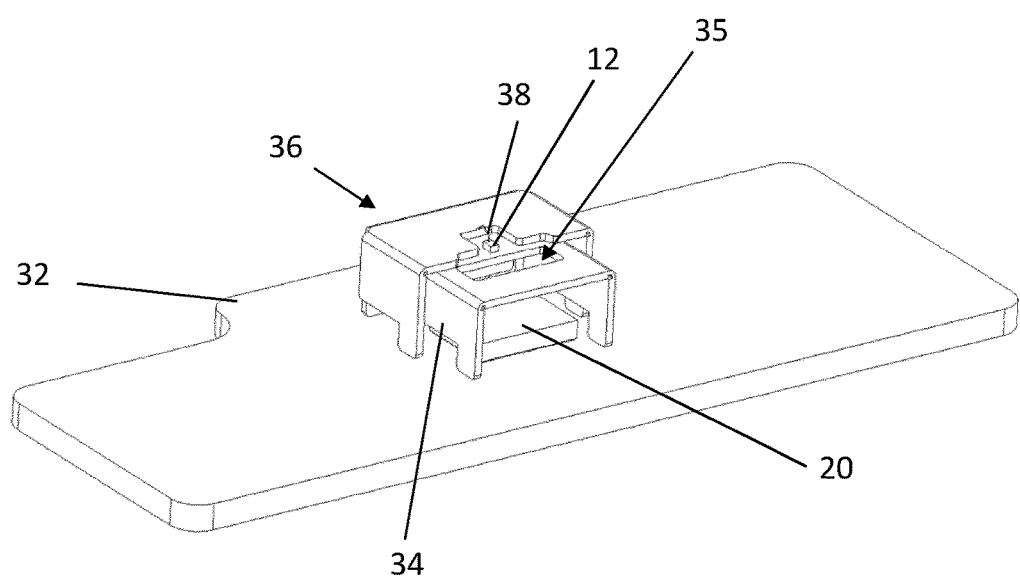
FIG. 5 shows an isometric view of the circuit board, light source, light source support structure, and sensor of the readhead of FIG. 1.

Referring now to FIGS. 4 and 5, an example embodiment of how the readhead can be constructed to achieve the above described optical layout will now be described.

As shown in FIG. 4, the readhead 4 comprises a body 30 to which the lens 18, window 22 and a printed circuit board (PCB) 32 are mounted (e.g. via gluing, mechanical and/or frictional means). The sensor 20, LED 12 and other electronic components (such as the above-mentioned CPU 24, memory 25 and interface 26—not shown in FIG. 4 or 5) are mechanically and electrically mounted to the PCB 32.

As illustrated, although the LED 12 is mounted to the PCB 32, the LED 12 is mounted to the circuit board "off-board", in that it is mounted to the PCB 32, but it is mounted via a raised support structure 34 which holds the LED 12 away from the PCB 32. In particular, the support structure 34 extends beyond the sensor 20 so as to hold the LED 12 further away from the PCB 32 than the sensor 20. Accordingly, as shown, the sensor 20 is mounted relatively close to the PCB 32 whereas the LED 12 is mounted relatively far from the PCB 32. As illustrated in FIG. 4, the LED 12 is much closer to the lens 18 than the PCB 32, whereas the sensor 20 is much closer to the PCB 32 than the lens 18. Accordingly, as shown, the light emitting element and the sensor are separated in the dimension which extends perpendicular to the plane of the sensor/circuit board. In particular, in the dimension which extends perpendicular to the plane of the sensor/circuit board, there is (free) space between the light emitting element and the sensor. In this example, the ratio of: i) the distance between the LED 12 emission surface (or emission point) to the sensor's 20 sensing plane, in the direction parallel to the imaging member's optical axis OA; and ii) the distance between the LED's 12 emission surface (or emission point) to lens 18, in the direction parallel to the imaging member's optical axis OA, is approximately 70:30.

In the embodiment described, the above-mentioned support structure 34 also forms/provides the electrical connection between the LED 12 and the PCB 32. Accordingly, in the embodiment described the support structure 34 for holding the LED 12 away from the PCB 32 is the cathode 34 between the LED 12 and the PCB 32. Accordingly, the cathode 34 comprises a rigid, electrically-conductive, support structure for the LED 12, which rises from the PCB 32. As shown in FIGS. 4 and 5, the support structure/cathode 34 comprises an opening/window 35 through which light reflected by the scale 6 can pass in order to reach the sensor 20.

In this embodiment, the anode 36 also comprises a rigid, electrically-conductive structure which rises from the PCB 32, and which is wire-bonded to the LED 12 via a bond wire 38 as shown in FIGS. 4 and 5. In other words, the readhead comprises a raised bond wire support structure which extends from the PCB 32, and wherein a bond wire 38 extends between it and the light emitting element 12. Although not necessary in this embodiment due to the shape and size of the anode, in other embodiments the anode 36 could also have an opening/window through which light emitted from the LED 12 can pass toward the lens 18/scale 6 and through which light reflected by the scale 6 can pass in order to reach the sensor 20.

As will be understood, the anode's 36 rigid structure could be omitted, and the LED 12 could be wire bonded via a bond wire which extends between the LED 12 and the PCB 32. However, it can be beneficial to reduce the length of the bond wire as much as possible because bond wires can be fragile, and the longer the bond wire the more likely it is to break.

Figure 6A:
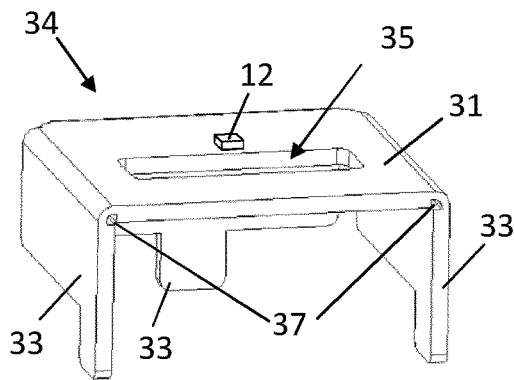
FIGS. 6a and 6b show isometric front and rear views of the light source's support structure.
Figure 6B:
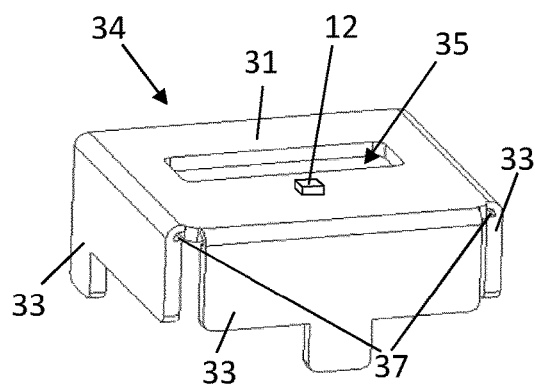

In this particular embodiment, the LED's support structure/cathode 34 and the bond wire support structure/anode 36 each comprise a sheet material part, each of which have been folded to provide a three-dimensional frame, and soldered to the PCB 32. In the particular embodiment described, the cathode 34 is brass, and the anode is bass, plated with nickel-gold. As indicted in FIGS. 6 and 7, fold-lines 37 have been chemi-etched into the sheet material in order to aid folding. Once folded, each of the support structures 34, 36 comprise a top surface 31 and a plurality of side supports (or "legs") 33 which are soldered to the PCB 32. As will be understood, the support structure/cathode 34 could be formed in other ways, for example it could be machined/cut into shape and/or stamp/pressed into shape. The bare-die LED 12 is mounted directly on the support structure/cathode 34 via conductive epoxy and the wire bond extends between the LED 12 and the top surface 31 of the anode 36.

Figure 6C:
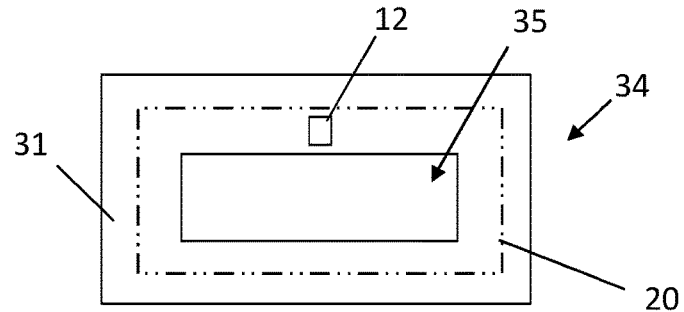
FIG. 6c shows a top plan view of the light source's support structure.
Figure 7A:
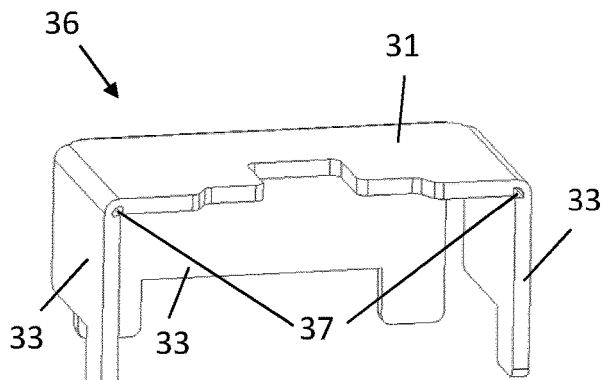
FIGS. 7a and 7b shows isometric front and rear views of the support structure for the light source's bond wire.
Figure 7B:
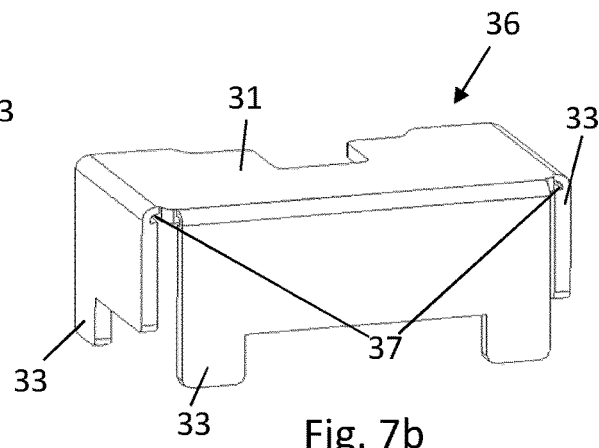

As illustrated in FIG. 6c, the top surface 31 of the LED's support structure 34 extends over/partially covers the sensor 20 (the outline of which is schematically illustrated in FIG. 6c by the phantom line). In other words, a line extending through and perpendicular to the plane of the sensor 20 (and PCB 32) also passes through the top surface 31 of the LED's support structure 34. Such a configuration enables the LED 12 to be placed very close to, and if desired, over, the sensor 20.

The readhead 4 is assembled by dead-reckoning the lens 18 within the body 30 of the readhead 4, and the body 30 being crimped in order to hold the lens 18 in place (although other ways of securing the lens 18 to the body can be used, such as by epoxy and/or by pushing the lens 18 into flexures which hold the lens). The PCB 32 comprising the LED 12 already mounted thereon, is then mounted to the body 30, e.g. by gluing and/or mechanical means such as crimping. If desired, an alignment process can be used to align the PCB (and hence the sensor and LED thereon) relative to the lens. Such an alignment process could comprise using a camera to look at the position of the PCB/components thereon and make adjustments based on the output of the camera, and/or connect to the PCB/components thereon and use the output of the sensor to make adjustments. Once assembled, a lid 46 is secured to the body 30, e.g. via gluing, crimping and/or welding.

In the embodiment described above, the bond wire support structure 34 also forms the cathode, but as will be understood, this need not necessarily be the case, and the support structure 34 could form the anode instead, for example.

In the embodiment described, the LED 12 is mechanically mounted to the PCB 32 via an electrode 34, but as will be understood this need not necessarily be the case. For instance, the LED 12 could be mechanically mounted directly to the PCB 32 via one or more non-electrically conductive members, and electrically connected to the PCB 32 via separate members, e.g. one or more wires (for instance, via wire bonding). Furthermore, the LED 12 need not necessarily be mounted directly to the PCB 32. For instance, the LED 12 could be mechanically mounted directly to the body 30, and electrically connected to the PCB 32 via one or more wires (e.g. via wire bonding). In another embodiment, the LED 12 could be electrically connected to a different PCB (i.e. not the same PCB 32 to which the sensor is connected).

Figure 8:
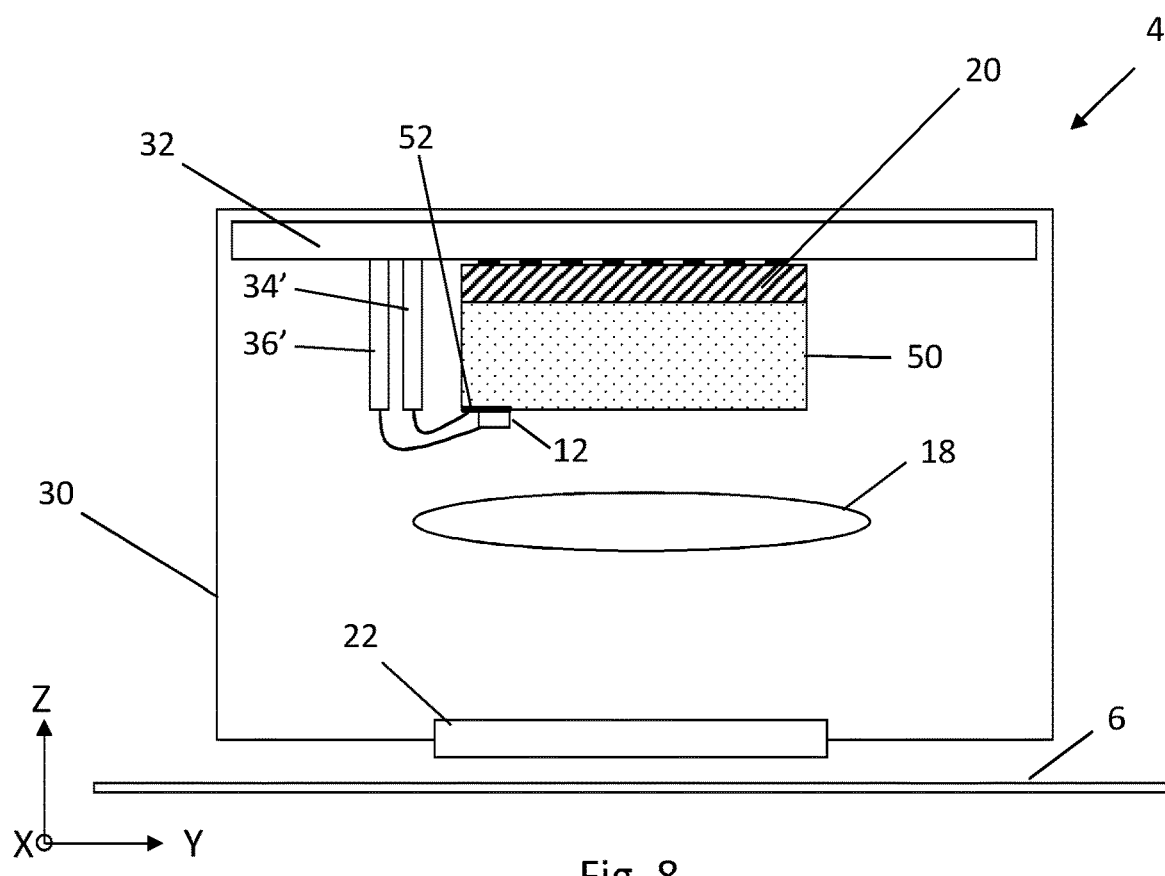
FIG. 8 shows an alternative embodiment of a readhead according to the present invention.

FIG. 8 illustrates a readhead 4' according to another embodiment of the invention. The readhead 4' of FIG. 8 shares many parts which are the same as that of the embodiment of FIGS. 1 to 7 and like parts share like reference numerals. In the embodiment of FIG. 8, the LED 12 is mounted to the circuit board via the sensor 20, by way of a transparent support structure 50 (e.g. a glass block 50). In particular, the glass block 50 is secured to the sensor 20 via adhesive epoxy. The LED 12 then sits on a conductive pad 52 which has been deposited on the side of the glass block 50 which faces the lens 18 and which is distal the sensor 20. The LED 12 is electrically connected to the circuit board 32 via an anode 36' and cathode 34' which in this embodiment each comprise raised bond wire support structures extending from the PCB 32, and bond wires which extend between them and the LED 12/conductive pad 52. As will be understood, in variations of this embodiment, the LED 12 could be connected to the circuit board in other ways, e.g. via an anode and cathode which are deposited on and run along the surface/side of the glass block 50, or even via an anode and cathode which run through the glass block 50.

As described above, the light emitting element's support structure 34 and/or the light emitting element 12 can be held directly over the sensor 20 such that a line extending perpendicular to the plane of the circuit board/sensor passes through both the light emitting element's support structure 34 and the sensor 20 and/or through both the light emitting element 12 and the sensor 20. As will be understood, and as schematically illustrated in FIG. 9 the sensor 20 could comprise at least one, and for example an array of, photosensitive elements 21, as well as other sub-components and packaging that make up the sensor 20. In other words, the sensor 20 could be a chip or component which comprises at least one, and for example an array of, photosensitive elements 21. For example, as illustrated in FIG. 9a, the light emitting element 12 can be located directly over the sensor chip 20 in a way which in which it does not sit directly over the photosensitive elements 21. Alternatively, as illustrated in FIG. 9b, the light emitting element 12 can be located directly over the sensor chip 20 in a way which in which the light emitting element 12 sits directly over the photosensitive elements 21, e.g. such that a line extending perpendicular to the plane of the circuit board/sensor (i.e. parallel to the Y-axis) passes through both the light emitting element 12 and the photosensitive elements 21.

In the embodiments shown, the LED 12 is mounted "off-board" by the support structure 34. Whilst this can be beneficial (e.g. so as to place the LED 12 at the lens' 18 focal plane, so as to achieve collimation, whilst enabling an image of the scale to be captured by the sensor 20), this need not necessarily be the case. For example, the LED 12 could be mounted on the PCB 32 such that it sits substantially in-plane with the sensor 20 (in other words, at substantially the same height as the sensor 20).

In the embodiments shown, the light impinging on the scale is collimated, but this need not necessarily be the case. Furthermore, even if the light impinging on the scale is collimated, the light reflected by the scale need not necessarily be collimated. For example, if the scale is curved, for instance if the scale is a ring scale, then the light reflected by the scale will not be collimated.

The invention claimed is:

1. An encoder apparatus comprising
a readhead for reading a reflective scale located adjacent the readhead, the readhead comprising:
 a circuit board on which a sensor comprising one or more photodiodes for detecting light reflected from the scale located adjacent the readhead is mounted; and
 at least one light emitting element mounted to the circuit board via a light emitting element support structure which holds the light emitting element away from the circuit board and a sensing plane of the sensor, wherein
 at least a part of the at least one light emitting element extends over the sensor, and
 the light emitting element support structure comprises a folded sheet-metal structure that supports the at least one light emitting element and that is mounted to the circuit board.

2. The encoder apparatus as claimed in claim 1, wherein the at least one light emitting element and the sensing plane of the sensor are separated in a dimension which extends perpendicular to the sensing plane of the sensor.

3. The encoder apparatus as claimed in claim 1, wherein the at least one light emitting element is located directly over the sensor such that a line extending perpendicular to the sensing plane of the sensor passes through both the light emitting element and the sensor.

4. The encoder apparatus as claimed in claim 1, wherein the light emitting element support structure forms a frame which is mounted to the circuit board separately from the sensor.

5. The encoder apparatus as claimed in claim 4, wherein the frame sits astride the sensor.

6. The encoder apparatus as claimed in claim 4,
 wherein the at least one light emitting element is mounted on a top surface of the frame, and
 wherein the top surface is secured to the circuit board via one or more supports extending between the circuit board and the top surface.

7. The encoder apparatus as claimed in claim 6, wherein the top surface and one or more supports comprise a single piece of material.

8. The encoder apparatus as claimed in claim 4, wherein the frame comprises an opaque material and is configured such that light returning from the scale can pass the frame to reach the sensor.

9. The encoder apparatus as claimed in claim 1, wherein the at least one light emitting element comprises a bare-die semi-conductor light emitting element.

10. The encoder apparatus as claimed in claim 1, wherein the light emitting element support structure comprises an electrically conductive material and comprises an anode and/or cathode for the at least one light emitting element.

11. The encoder apparatus as claimed in claim 1,
 comprising a bond wire support structure extending from the circuit board,
 wherein a bond wire extends between the bond wire support structure and the at least one light emitting element.

* * * * *